983X
No Printed Specification Available
S. Tucker,
Washing Machine,
Patented Jan. 7, 1809
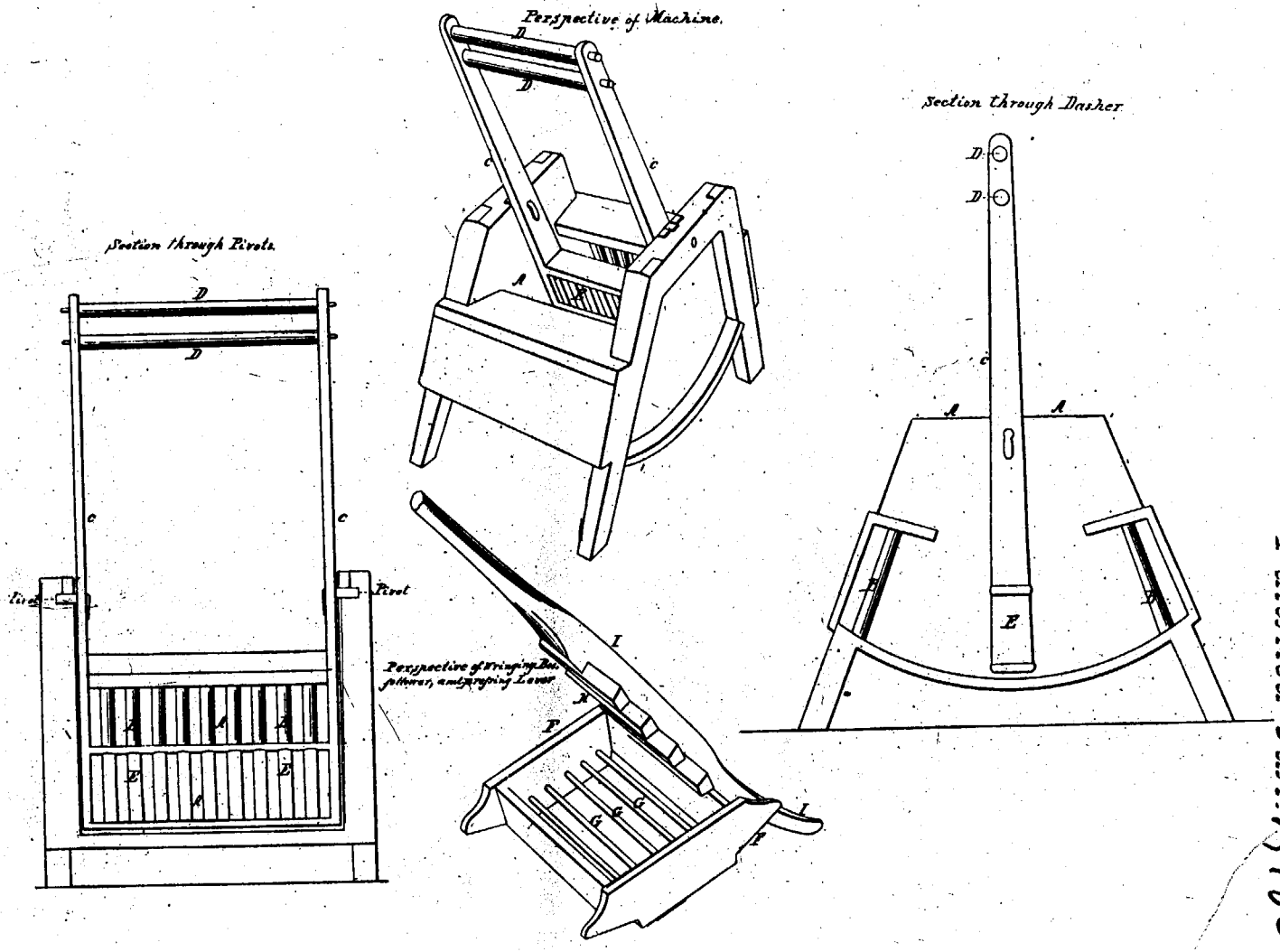

983X

Septimus Tucker
Letters Patent

The Schedule referred to in these Letters Patent and making part of the same containing a description in the words of the said Septimus Tucker himself of his washing and wringing machine.

The Box Trough or Tub for washg has its bottom formed to part of a circle. The sides are upright and the ends are nearly in the line of Radii to the same circle. The Dimensions may be proportioned to the quantity to be washed at one time. Within this Trough or Tub, and near to each end thereof, there is a Row of rounds extending from side to side standing nearly upright but inclining with their upper ends towards the Centre. Near the bottom of the tub and on the side of the vessel there is a cock or vent to let off the suds or foul water. The Trough or Tub is supported by four legs attached to the side of the vessel; & extending in a line with the ends thereof, being considerably further apart at the bottom than at the Top.

The Dasher or Frame consists of two uprights standing so far apart as just to go within the Tub or Trough. They are connected and kept at proper distance at or near the top by rounds or bars which serve for handles, when the machine is used.

The bottom of this Frame, which constitutes the Dasher is composed of two horizontal pieces, extending across between the uprights and so far apart as to admit a row of wooden Rods standg upright to be fastened in them, which form the dasher.

This Frame is connected with the sides of the Tub by Bolts or pins, upon which it rests and swings, when the upper end is moved backwards and forwards by the person using the machine. The Articles to be washed are placed in the Tub, on each side of this moving dasher or frame, and are squeezed between it and the Rounds at the end of the Trough or

983X

Tub, as the upper end of the Frame is moved by the person wash
ing. The wringing apparatus consists of a Box which goes
within the uprights of the Frame and rests on the top of the
Tub over the opening therein. It has four upright sides
& the bottom is composed of rounds or strips of wood
with openings between them to allow the water or suds to descend
from the cloaths into the Trough or tub. The Top is open
and when the articles which are to be wrung and rinsed are
laid within it, a presser or follower of wood of nearly the size
of this Box, and attached to a pressing lever or beam is placed
on the ( [illegible] )
Trough or Tub by a chain or other fastening and the force or weight
of the person washing applied to the other end, the cloaths within
this box will be rinsed or so pressed and squeezed as to force
out the suds and water, thus performing the operation of wringing.

Witnesses
Nich^s. King
[illegible] William Thornton
[illegible]

Septimus Tucker.

(Patented 12 Jan^y 1809)

Received 23^d June 1838 & Recorded [illegible].

Drawing made